United States Patent [19]

Takagi

[11] 4,352,501
[45] Oct. 5, 1982

[54] SUSPENSION AND STEERING ASSEMBLY FOR SNOWMOBILE

[75] Inventor: Izumi Takagi, Akashi, Japan

[73] Assignee: Kawasaki Jukogyo Kabushiki Kaisha, Hyogo, Japan

[21] Appl. No.: 146,911

[22] Filed: May 5, 1980

[51] Int. Cl.³ ............................................. B62B 13/08
[52] U.S. Cl. .................................... 280/16; 180/190; 280/21 R
[58] Field of Search ................... 280/16, 17, 21 R, 25, 280/26, 27, 28, 276, 277; 180/190, 191, 192, 193, 218, 227

[56] References Cited

U.S. PATENT DOCUMENTS

| | | | |
|---|---|---|---|
| 2,953,395 | 9/1960 | Turner | 280/276 |
| 3,425,707 | 2/1969 | Horiuchi et al. | 280/16 |
| 3,588,138 | 6/1971 | Cerny | 280/16 |
| 3,635,497 | 1/1972 | Porsche | 280/16 |
| 3,920,091 | 11/1975 | Kuwano et al. | 180/190 |
| 3,931,862 | 1/1976 | Cote | 280/21 R |
| 3,977,485 | 8/1976 | West | 280/21 R |

FOREIGN PATENT DOCUMENTS 2614732 10/1977 Fed. Rep. of Germany ........ 280/16

Primary Examiner—David M. Mitchell
Attorney, Agent, or Firm—Jordan and Hamburg

[57] ABSTRACT

Suspension and steering assembly for a snowmobile including at least one ski for supporting a front half of its body and also for steering the snowmobile, comprising two telescoping strut means disposed parallel to each other, spring means operative to cause the strut member to telescopically expand, shock absorber means operative to dampen the telescopic movement of the strut means and steering arm means. Each strut means, comprises an inner member and an outer member telescopically sliding one into the other. The spring means and the shock absorber(s) are mounted in the interior of one or both of the strut means. Two inner strut members and two outer strut members are mutually fixed to each other respectively. The two inner strut members in the fixed relation are pivotally connected to the ski. One of outer strut members is rotatably supported to the body of the snowmobile. Steering arm means is fixedly secured to one of the outer strut members for rotating the strut means about its own axis when a steering gear is actuated.

6 Claims, 1 Drawing Figure

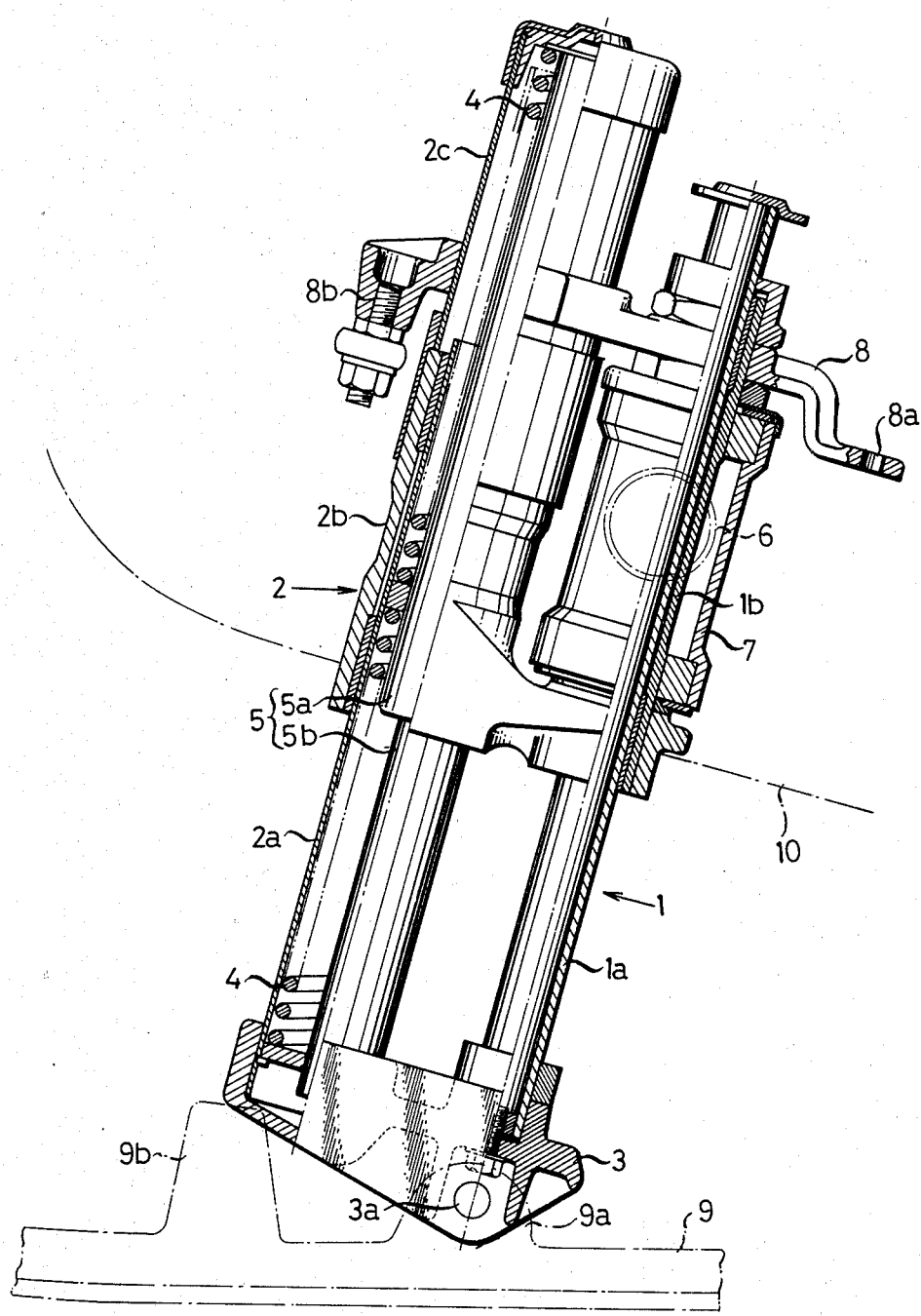

SUSPENSION AND STEERING ASSEMBLY FOR SNOWMOBILE

BACKGROUND OF THE INVENTION

This invention relates to a suspension and steering assembly for a snowmobile having at least one ski for supporting a front half of its body and also for steering the snowmobile.

Generally, a snowmobile includes full tractor treads supporting a rear portion of its body and also for driving the snowmobile, and one or two skis for supporting a front portion of its body and also for steering the snowmobile. When a leaf spring is used as an element of a suspension and steering assembly connecting the ski to the body of the snowmobile, it is impossible to obtain vertical displacements of a large value. Thus a coil spring and a shock absorber are mounted coaxially to provide a hollow strut member that can be expanded and compressed considerably in an axial direction with respect to the ski in most of the snowmobiles now in use.

The aforesaid suspension and steering assembly is substantially similar in construction to that of motorcycles. However, unlike a motorcycle which is in contact with the ground at one point on the periphery of a tire of each wheel, a snowmobile is in contact at the undersurface of each ski with the surface of snow. The undersurface of the ski is in contact with the surface of snow in a wide area extending from front to rear, so that a high torque is required to turn the ski on the snow. When the suspension and steering assembly includes a single strut member, it is necessary that the torsional rigidity of the strut member and the strength of the connection of the strut member to the ski be increased. This would increase cost or create a source of potential trouble. The ski which is an elongated, resilient strip extending forwardly and rearwardly from its connection to the suspension, tends to flutter, and when the suspension supporting it is not rigid enough, the flutter phenomenon becomes marked and would not only impair the riding comfort of the riders but also cause damage to the ski and the suspension and steering assembly.

The flutter phenomenon occurs when a resilient or oscillating plate-like member moves in a direction of its plane in a fluid or placed in a flowing fluid. In such a case, vortices of the fluid occurs at the trailing edge of the member and causes the trailing edge to vibrate in a direction normal to the plane of the member. One example of this phenomenon is a flag fluttering in the wind. When the frequency of vibration coincides with the natural frequency of the member, the member is excited and its amplitude gradually increases until the member and its connection are damaged in the worst cases.

The aforesaid disadvantages of the prior art are obviated by the present invention. Accordingly, the invention has as its object the provision of an improved suspension and steering assembly for a snowmobile which enables a steering torque to be transmitted smoothly to the ski, to increase the rigidity of the suspension, to thereby minimize fluttering of the ski and improve the dynamic characteristics of the snowmobile.

SUMMARY OF THE INVENTION

According to the invention, there is provided a suspension and steering assembly for a snowmobile including at least one ski for supporting a front half of its body and also for steering the snowmobile, comprising two strut means disposed parallel to each other and each comprising an inner member and an outer member telescopically sliding one into the other, spring means operative to cause the strut means to telescopically expand, shock absorber means operative to dampen the telescopic movement of the strut means, means for supporting the outer member of one strut means for rotation relative to the body of the snowmobile while preventing same from moving axially or laterally of the body, steering arm means fixedly connecting the outer member of one strut means to the outer member of the other strut means for causing the two strut means to rotate about the axis of the strut means supporting the body of the snowmobile by the action of a steering mechanism, and ski mounting means for pivotally connecting to the ski the two inner strut members in fixed relation.

Additional and other objects, features and advantages of the invention will become apparent from the description set forth hereinafter when considered in conjunction with the accompanying drawing, in which:

BRIEF DESCRIPTION OF THE DRAWINGS

The single drawing is a side view, with certain parts being shown in section, of the suspension and steering assembly comprising one embodiment of the invention.

DETAILED DESCRIPTION OF A PREFERRED EMBODIMENT

A preferred embodiment of the invention will now be described by referring to the drawing. As shown, two strut means 1 and 2 are mounted parallel to each other between a ski 9 and a body 10 of the snowmobile. The strut means 1 comprises a first strut member (inner member) 1a and a second strut member (outer member) 1b telescopically sliding one into the other. The first strut member 1a is fitted at its lower end to an opening formed on an upper surface of a ski mounting member 3 and fixed in place. The strut means 2 comprises a third strut member (inner member) 2a and a fourth strut member (outer member) 2b telescopically sliding one into the other, and a housing 2c connected to an upper end of the fourth strut member 2b. The third strut member 2a is fitted at its lower end in an opening formed in the upper surface of the ski mounting member 3 and fixed in place. The strut means 2 can be telescopically expanded and contracted as the third strut member (inner member) 2a axially moves in sliding motion in the fourth strut member (outer member) 2b.

A coil spring 4 is mounted in the interior of the strut means 2 and maintained in pressing engagement at its lower end with the bottom of the third strut member 2a and at its upper end with an upper end of the housing 2c. A shock absorber 5 is also mounted in the interior of the strut means 2 and includes a shock absorbing chamber 5a secured to the upper end of the housing 2c, and a shock absorbing piston rod 5b secured at its lower end to the bottom of the third strut member 2a, to perform the function of braking a sudden expanding or contracting movement of the strut means 2.

The second strut member 1b which is the outer member of the strut means 1 is supported by a support member 7 fixedly secured to a stay 6 secured to the body 10, for rotation about its own axis but against axial movement and lateral movement with respect to the body 10.

The second strut member 1b and the housing 2c are fixedly connected to each other by a steering arm 8 of a spectacle frame form having two openings compatible with the outer diameters of the member 1b and housing 2c. A connecting opening 8a formed in a projection at one side of the steering arm 8 receives therein and securedly supports one end of a steering rod connected to a steering gear, not shown, and another connecting opening 8b formed in a projection at the other side of the steering arm 8 has fitted therein one end of a tie rod connected to the corresponding member of the other suspension and steering assembly for the snowmobile for steering the latter.

The ski mounting member 3 is formed with a transversely extending opening 3a which receives therein a bolt inserted in openings formed in projections 9a of the ski 9 disposed on opposite sides of the opening 3a, to pivotally connect the ski 9 to the suspension and steering assembly. An end portion of the ski mounting member 3 opposite the transversely extending opening 3a is held at opposite sides thereof by members 9b secured to the ski 9.

The suspension and steering assembly according to the invention is constructed as described hereinabove. The snowmobile provided with the assembly can travel smoothly because the vibration and oscillation of the body 10 are relieved since the pitching movement and the vertical movement of the ski when the surface of the snow is rough are absorbed by the shock absorber 5 and the coil spring 4.

In steering the snowmobile, manipulation of the steering mechanism, not shown, causes the steering arm 8 through the steering rod to rotate about the axis of the strut means 1, so that the strut means 1, strut means 2 and ski mounting member 3 rotate as a unit about the axis of the strut member 1. As aforesaid, the ski mounting member 3 is pivotally connected to the ski 9 by the connecting bolt and held at the opposite sides of its forward portion by the members 9b secured to the ski 9. Thus when the ski mounting member 3 is rotated, the forward portion of the member 3 presses one of the members 9b secured to the ski 9 to thereby cause the ski 9 to rotate about the axis of the strut means 1. At this time, transmission of a steering torque does not depend on the torsional rigidity alone of the strut as is the case with a suspension and steering assembly of the prior art having a single strut, but moves the strut means 2 through the steering arm 8 to thereby rotate the ski mounting member 3. Thus the provision of the two strut means offers the advantage that the torsional rigidity can be reduced as compared with the prior art. Moreover, the leverage of moment for turning the ski 9 has a length equal to the distance between the pivot 3a and the members 9b holding the forward end of the member 3, so that no concentrated load of a high magnitude is applied to the connecting bolt and the mounting portion.

The strut means 1 and 2 are disposed in parallel relation and unitarily connected to each other at the upper, intermediate and lower portions, so that the rigidity of the suspension and steering assembly is markedly increased as compared with the prior art using a single strut. This arrangement is conductive to considerably reducing fluttering of the ski when the snowmobile travels at high speed or makes a turn.

In the embodiment shown and described hereinabove, the shock absorber and the coil spring are both mounted in the second strut means. However, the invention is not limited to this specific mounting of the shock absorber and the coil spring, and that they may be mounted in the first strut means or separately mounted in the first and second strut means. When only one ski is used for supporting the front portion of the body of a snowmobile, the tie rod connecting together the steering arms of the left and right suspension and steering assemblies may, of course, be dispensed with.

A member separate from the ski mounting member may be used for maintaining the two strut means in mutually fixed relation.

From the foregoing description, it will be appreciated that the invention enables the torsional moment applied to the strut means forming the suspension for the front half of the body of the snowmobile and the stresses applied to the means for connecting the strut means to the ski to be reduced, and permits fluttering of the ski to be minimized. Thus the invention can achieve excellent effects in improving the dynamic characteristics of the snowmobile, increasing the riding comfort of the riders and reducing accidents during travel of the snowmobile.

What is claimed is:

1. A suspension and steering system for a snowmobile comprising:

at least two skis for supporting and steering the snowmobile;

for each of said at least two skis a suspension and steering assembly comprising two strut means disposed substantially parallel to each other, each strut means comprising an inner member telescopically sliding into an outer member;

spring means engaged with at least one of the two strut means to cause said strut means to telescopically expand;

shock absorber means engaged with at least one of the two strut means to dampen the telescopic movement of said strut means;

means for supporting the outer member of one of said two strut means, permitting rotation of said strut means around its own axis and preventing axial or lateral movement of said strut means with respect to the snowmobile;

steering means in one of said assemblies rigidly connecting the outer members of both strut means to cause the two strut means to rotate about the axis of the strut means engaged with the supporting means, said steering means adapted to receive a steering rod connected to a steering gear and a tie rod connected to the other suspension and steering assembly; and ski mounting means for pivotally connecting the ski to both of the two inner strut members of both strut means in a rigidly fixed relationship, in which said ski mounting means is pivotally connected to the ski at one point and laterally retained between members secured to the ski at another point.

2. The suspension and steering assembly of claim 1 in which said spring means and said shock absorber means are both engaged on the same strut means.

3. The suspension and steering system of claim 2 in which said spring means and said shock absorber means are both engaged on the strut means opposite the strut means engaged with the supporting means.

4. The suspension and steering system of claim 3 in which said ski mounting means pivotally connects the inner strut member of said strut means engaged with said supporting means to the ski and laterally retains the inner strut member of said other strut means to said ski.

5. The suspension and steering system of claim 1 in which said ski mounting means is pivotally connected with the ski at a point along the axis of the strut means engaged with the supporting means.

6. The suspension and steering system of claim 5 in which said two strut means are additionally connected with one another in a rigid, fixed relationship at a point between said steering means and said ski mounting means.

* * * * *